United States Patent
Zehnder, II et al.

[11] Patent Number: 6,006,520
[45] Date of Patent: Dec. 28, 1999

[54] PNEUMATIC ASSISTED BRAKE APPLY SYSTEM

[75] Inventors: James William Zehnder, II, Huber Heights; Donald Lee Parker, Middletown; Timothy Allen Haerr, Enon; John Dudley Altevers, Huber Heights; Craig Alan Osterday, Dayton; Robert Lee Phillis, Covington, all of Ohio

[73] Assignee: General Motors Corporation, Detroit, Mich.

[21] Appl. No.: 08/944,774

[22] Filed: Oct. 6, 1997

[51] Int. Cl.⁶ .............................. F16D 31/02; F15B 9/10
[52] U.S. Cl. ............................. 60/415; 60/453; 91/376 R
[58] Field of Search ............................. 303/118.1, 114.3; 60/415, 416, 418, 410, 412, 453; 91/376 R, 374

[56] References Cited

U.S. PATENT DOCUMENTS

| | | | |
|---|---|---|---|
| 2,792,686 | 5/1957 | Ingres | 91/376 R |
| 2,974,494 | 3/1961 | Rike | 91/376 R |
| 3,049,099 | 8/1962 | Price | 91/376 R |
| 3,068,842 | 12/1962 | Brooks | 91/376 R |
| 3,082,744 | 3/1963 | Gardner | 91/376 R |
| 3,091,255 | 5/1963 | Wahlstrom | 91/376 R |
| 3,143,927 | 8/1964 | French et al. | 91/376 R |
| 3,149,539 | 9/1964 | Prather | 91/376 R |
| 3,151,530 | 10/1964 | Brown | 91/376 R |
| 3,463,054 | 8/1969 | Farr | 91/376 R |
| 3,950,946 | 4/1976 | Sakai et al. | 60/412 X |
| 4,181,064 | 1/1980 | Flory . | |
| 4,891,941 | 1/1990 | Heintz | 60/417 X |
| 4,905,571 | 3/1990 | DeHoff et al. . | |
| 4,914,917 | 4/1990 | Schonlau | 91/376 R |
| 5,031,404 | 7/1991 | Flory et al. . | |
| 5,275,476 | 1/1994 | Maisch | 60/453 X |
| 5,467,595 | 11/1995 | Smith | 60/453 X |
| 5,493,949 | 2/1996 | Castel et al. | 91/376 R |
| 5,711,150 | 1/1998 | Oshita et al. | 60/453 X |

FOREIGN PATENT DOCUMENTS

| | | | |
|---|---|---|---|
| 593965 | 3/1960 | Canada | 91/376 R |
| 692795 | 8/1964 | Canada | 91/376 R |

*Primary Examiner*—John E. Ryznic
*Attorney, Agent, or Firm*—Jeffrey A. Sedlar; Robert M. Sigler

[57] ABSTRACT

A brake apply system includes a power booster in which, when released and at-rest, a leg of a stop engages a clip and an extension of a valve body engages the clip so that an annular rib of the valve body is axially spaced away from the stop by a distance G. At the same time, a first valve seat is engaged with a first annular valve element closing a pressure supply conduit off from a variable pressure chamber and a second valve seat is spaced away from a second annular valve element by a distance T, opening the variable pressure chamber to an atmospheric pressure chamber. When the power booster is applied, the second valve seat moves the distance T and engages the second annular valve element closing the variable pressure chamber off from the atmospheric pressure chamber and the first valve seat separates from the first annular valve element opening the pressure supply conduit to the variable pressure chamber. The stop moves against the annular rib of the valve body so that when the pushrod is initially released the second annular valve element moves away from the second valve seat a distance equal to G+T. A pressurized air supply communicates with the power booster and includes a compressor and a dryer. When the compressor is turned off a solenoid valve opens and a quantity of dry air contained in a regeneration reservoir passes through the dryer, regenerating the dryer.

10 Claims, 3 Drawing Sheets

PNEUMATIC ASSISTED BRAKE APPLY SYSTEM

TECHNICAL FIELD

The present invention relates to a pneumatic assisted brake apply system. More particularly, the invention relates to a brake apply system for a vehicle, with a positive pressure pneumatic power booster that operates in conjunction with a pneumatic power supply.

BACKGROUND OF THE INVENTION

The typical vehicle brake apply system includes a hydraulic master cylinder that has a fluid link to the wheel brakes and that provides the pressure apply and release mechanism for actuating the wheel brakes in response to the manual application of force to a brake pedal. Generally, a power booster is employed to intensify the force exerted by the driver, and to apply the intensified force to the master cylinder. The majority of power boosters operate on the pressure differential that exists between the engine intake developed vacuum and atmospheric pressure. In some applications the engine's vacuum is augmented with an ancillary pumping device.

As an optional device that doesn't require an engine vacuum source, or in an effort to make power boosters smaller, and/or capable of developing greater input force intensification, hydraulic and pneumatic operating power boosters have been used. An example of a hydraulic power booster is disclosed in U.S. Pat. No. 4,181,064 to Flory, which is assigned to the assignee of this invention. An example of a pneumatic power booster is disclosed in U.S. Pat. No. 5,031,404 to Flory, et al, which is also assigned to the assignee of this invention. That pneumatic booster includes a housing with a pair of flexible diaphragms spaced away from one another and forming a pair of sealed chambers within the housing. A power piston for connection with the master cylinder, a chamber valve seat that separates the chambers, a spring biased control valve and a pedal linkage are all slidably carried within the housing. Movement of a control valve by the pedal linkage operates to apply air pressure to the diaphragms which apply force to the power piston and the master cylinder.

While this prior art pneumatic power booster provides a complete and operationally advantageous unit, manufacturability improvements and cost reductions are continuously desirable. Accordingly, a new pneumatic power booster is sought.

SUMMARY OF THE INVENTION

According to a preferred aspect of the present invention, a brake apply system includes a power booster having a housing with a power piston carried in the housing and being translatable within the housing. The power piston includes a body having an open center area with a first valve seat and a second valve seat positioned in the open center area. The power piston also includes an annular stop that has a center hole, a first side, and a second side. The first side faces the open center area of the body and includes a first annular valve element, and the second side faces away from the open center area and includes at least one extending leg. A diaphragm type sealing element is carried between the power piston and the housing so that a variable pressure chamber and an atmospheric pressure chamber are defined in the housing on opposite sides of the power piston. A pressure supply conduit is provided that passes through the power piston body to the open center area. A valve body is positioned in the open center area and has a second annular valve element, a radially extending and annular rib, and an extension that is positionable through the center hole of the annular stop. A pushrod engages the valve body and a clip surrounds the pushrod.

When the power booster is completely released and at-rest, the leg of the stop engages the clip, and the extension of the valve body engages the clip so that the annular rib of the valve body is axially spaced away from the stop by a distance G. At the same time, the first valve seat is engaged with the first annular valve element closing the pressure supply conduit off from the variable pressure chamber and the second valve seat is spaced away from the second annular valve element by a distance T, opening the variable pressure chamber to the atmospheric pressure chamber.

When the power booster is applied by operation of the pushrod, the second annular valve element moves the distance T and engages the second valve seat closing the variable pressure chamber off from the atmospheric pressure chamber and the first annular valve element separates from the first valve seat opening the pressure supply conduit to the variable pressure chamber. In response, the stop moves against the annular rib of the valve body so that when the pushrod is initially released, the second annular valve element moves away from the second valve seat an advantageously increased distance equal to G+T.

According to another preferred aspect of the present invention, a brake apply system includes a pressurized air supply connected to the pressure supply conduit of the power booster. The pressurized air supply includes a storage reservoir that stores a supply of dry air for delivery to the variable pressure chamber. A compressor operates to charge the storage reservoir, and a conduit extends between the compressor and the storage reservoir. The conduit passes through a dryer, and a regeneration reservoir is connected with the conduit between the dryer and the storage reservoir. A discharge line includes a normally open solenoid valve and is connected with the conduit between the dryer and the compressor. When the compressor is turned on the solenoid valve is closed, and when the compressor is turned off the solenoid valve opens and a quantity of dry air that has been contained in the regeneration reservoir passes through the dryer, the discharge line and the solenoid valve, regenerating the dryer.

DESCRIPTION OF THE PREFERRED EMBODIMENT

Figure 2:
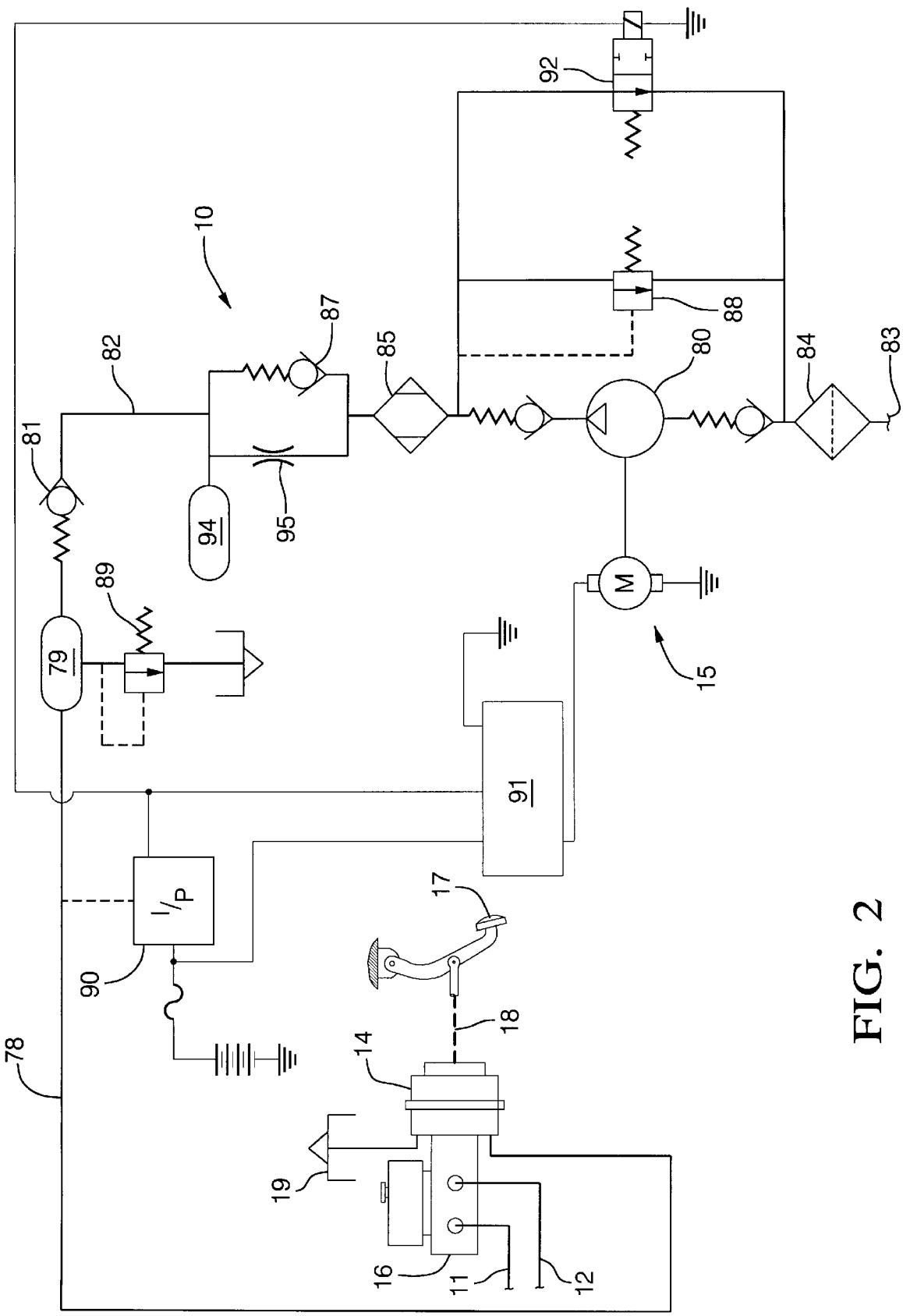
FIG. 2 is a diagrammatic illustration of a pneumatic assisted brake apply system incorporating features of the present invention.

Referring to the drawings, illustrated in FIG. 2 is a pneumatic assisted brake apply system 10 for hydraulic fluid based actuation of an associated braking system through the brake lines 11 and 12. Brake apply system 10 includes a power booster 14 that operates with compressed air assist provided by a pressurized air supply 15 for power augmented actuation of the master cylinder 16. In general, an application of force to the brake pedal 17 is transmitted to the power booster 14 through pushrod 18. The force is intensified by the effect of elevated air pressure as supplied by pressurized air source 15, and the intensified force is applied to the master cylinder 16. When the brake pedal is released, the pressurized air admitted into the power booster 14 is discharged to atmosphere through the exhaust outlet 19.

Figure 1:
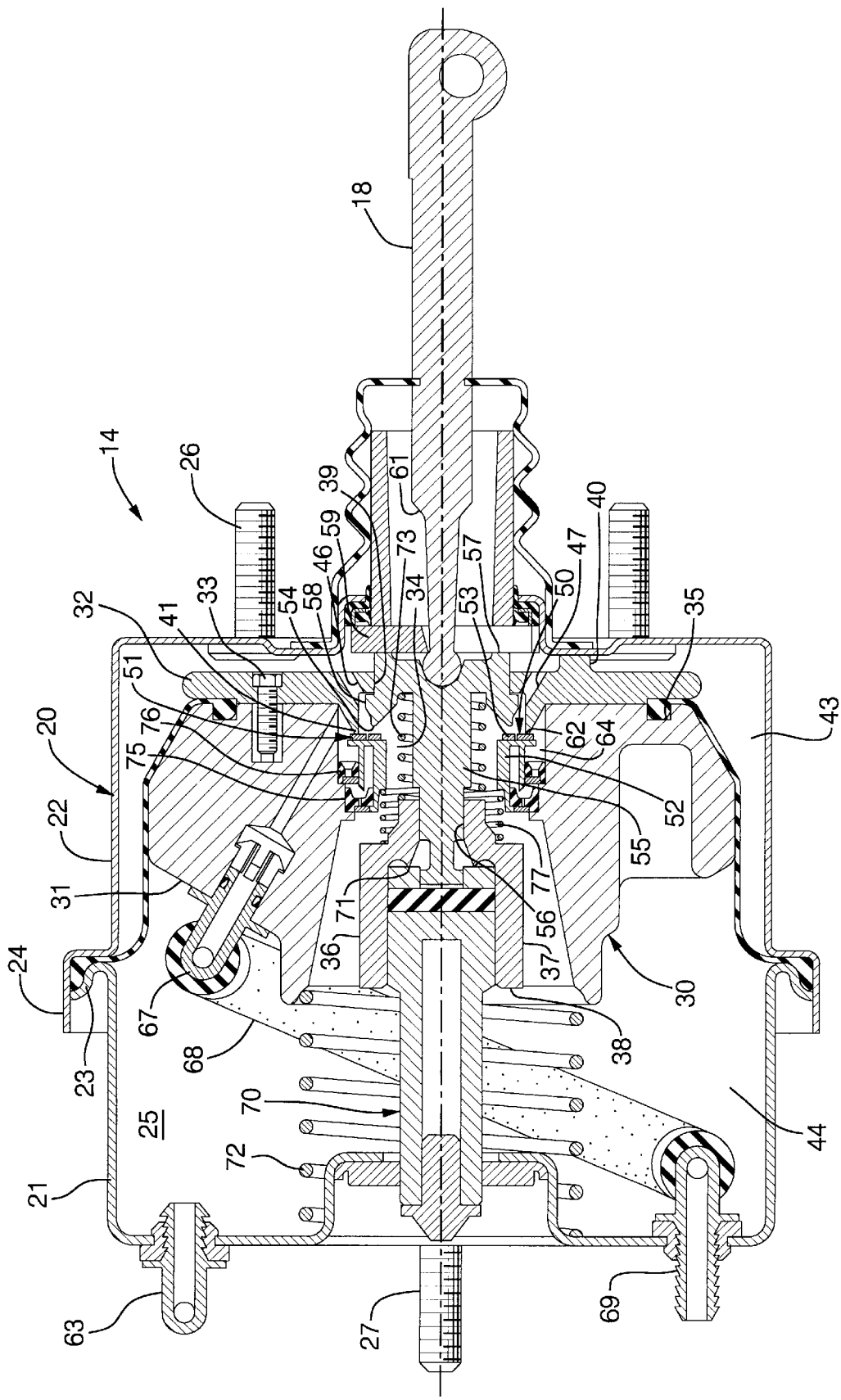
FIG. 1 is a cross sectional illustration of a pneumatic power booster as used in the brake apply system of FIG. 2 and shown in a released condition.

The power booster 14 is more particularly illustrated in FIG. 1 which shows the presently preferred embodiment in detail. Power booster 14 includes a housing 20 that is formed by the joining of front housing section 21 with rear housing section 22 through integrally formed engagement flanges 23 and 24, respectively. The housing 20 carries a plurality of fasteners 26 that are adapted for securing the power booster 14 to the associated vehicle's structure (not illustrated). The housing 20 also carries a plurality of fasteners represented by fastener 27, for engagement with the master cylinder 16.

A cavity 25 is defined by the housing 20 and contains a power piston 30 that includes a body 31 and a stop 32 that is fixed to the body 31 by a plurality of fasteners, represented by the fastener 33. The body 31 is generally annular in shape and includes an open center area 34 and an annular groove 35. The body 31 also includes a pair of bores 36 and 37 that extend from front edge 38 to the open center area 34. The stop 32 is generally annular in shape and includes a center hole 39 with a plurality of protruding legs, represented by leg 40, that are engageable with the rear housing section 22. The stop 32 also includes an angled annular rib forming an annular valve element 41 that projects into the open center area 34.

The stop 32 captures an annular bead of flexible sealing diaphragm 42 within the annular groove 35, and the diaphragm 42 extends into the confined area between the flanges 23 and 24, where another annular bead is captured. Through this structure, the power piston 30 and diaphragm 42 separate the cavity 25 into a variable pressure chamber 43 and an atmospheric pressure chamber 44. This completely isolates the two chambers 43, 44, except for a controllable means of communication provided through the power piston 30. The controllable means include bores 36 and 37, which provide openings between the atmospheric pressure chamber 44 and the open center area 34, and bores 46 and 47, which provide openings through the stop 32 between variable pressure chamber 43 and the open center area 34.

To manage the movement of air through the open center area 34, a pair of valves 50 and 51 are positioned to provide an efficient control mechanism. The valve 50 includes a second valve seat 53 formed on a floating valve element 52 which is positioned against a step of body 31 and within open center area 34, and includes annular valve element 54 which is formed as part of valve body 55. Valve body 55 extends through center hole 39 of stop 32, through the open center area 34, and into bore 56 of power piston body 31. An annular extension 57, which may be in the form of an extending leg, projects rearwardly from valve body 55 and an annular rib 58 projects radially from the valve body 55. A clip 59 is fixed in position relative to the housing 20 and maintains the pushrod 18 in position. The pushrod 18 includes a shoulder 61 that is engageable with the clip 59 to transfer force to the stop 32 for moving the power piston 30 manually, if required.

When the power booster 14 is fully released and at-rest as shown in FIG. 1, the extension 57 of valve body 55 engages the clip 59 spacing the annular rib 58 axially away from the stop 32 by a distance "G" and the annular valve element 54 is spaced away from the valve seat 53 by a distance "T." This opens the open center area 34 to the variable pressure chamber 43 through the bores 46 and 47 and to the atmospheric pressure chamber through the bores 36 and 37. The atmospheric pressure chamber 44 is open to atmosphere through the fitting 63.

The valve 51 includes a first valve seat 62 formed on floating valve element 52 which is positioned against a step of body 31 and within open center area 34, and includes annular valve element 41 which is formed as part of stop 32. When the power booster 14 is fully released and at-rest as shown in FIG. 1, the leg 40 of stop 32 engages the rear housing section 22 and the annular valve element 41 is positioned against the valve seat 62. This closes off a pressure chamber 64 that is continuously open to a pressure supply conduit 65 that extends through the power piston body 31. A fitting 67 is positioned in the pressure supply conduit 65 and a hose 68 is coiled within atmospheric chamber 44 and extends from the fitting 67 to another fitting 69 that passes through the front housing section 21. As seen in FIG. 2, the fitting 69 is connected to the pressurized air supply 15 through line 78.

Power booster 14 includes an output rod assembly 70 with a reaction assembly and is engaged by the shoulder 71 of power piston 30 operating to provide feedback through the valve body 55 and pushrod 18. A return spring 72 biases the power piston 30 toward the rear housing section 22, and a spring 73 biases the valve body 55 toward the pushrod 18. The valve seats 53 and 62 are carried on floating valve element 52 which slides within the seals 75 and 76 and is biased toward the stop 32 by a spring 77.

Figure 3:
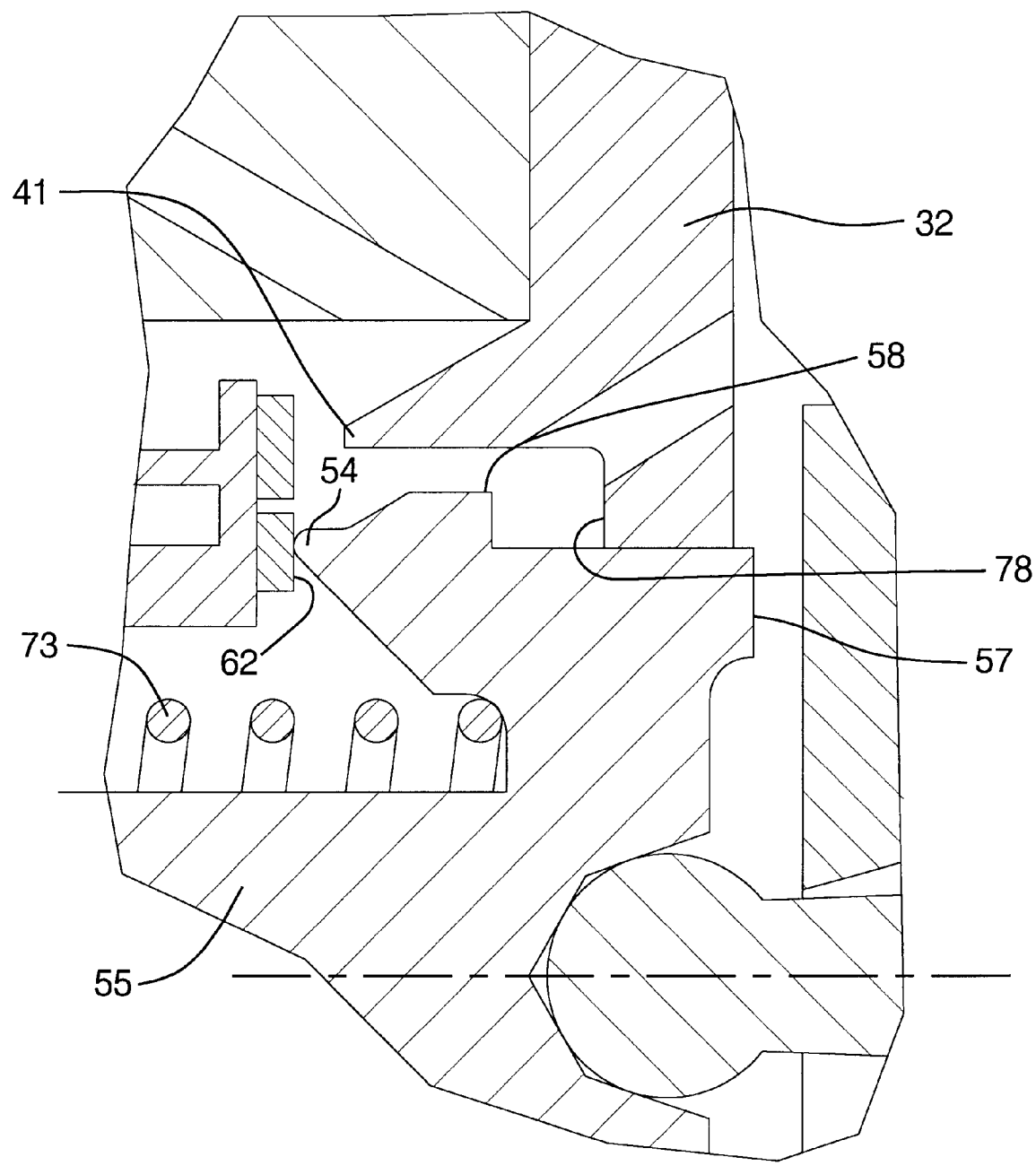
FIG. 3 is a fragmentary cross sectional detail illustration of the pneumatic power booster of FIG. 1 shown in an actuated position corresponding to an apply condition.

When the brake apply system 10 is actuated by the application of force to the brake pedal 17, force is transferred through the pushrod 18 to the valve body 55. The valve body 55 operates against the force of spring 73, and is required to move the distance T to close the valve 50 as shown in FIG. 3. Closure of the valve 50 closes off the open center area 34 from the atmospheric pressure chamber 44. Once the annular valve element 54 is closed against valve seat 53, the valve body 55 moves the floating valve element 52 to compress the spring 77 separating the annular valve element 41 from the valve seat 62 as shown in FIG. 3. This opens the open center area 34 to the pressure chamber 64 so that pressurized air is admitted to the open center area 34 and through the bores 46 and 47, to the variable pressure chamber 43. As the pressure rises in variable pressure chamber 43, the power piston 30 is forced to move against the return spring 72 and applies force through the output rod assembly 70 to the master cylinder 16.

As seen in FIG. 3, when the brake apply system 10 is actuated, the annular extension 57 of stop 32 is separated from rear housing section 22. Accordingly, when the brake pedal 17 is released, the spring 73 axially moves the valve body to a position where annular rib 58 engages the step 78 of stop 32. This means that the valve body moves so that the annular valve element 54 separates from the valve seat 62 a distance equal to G+T. Annular valve element 41 reengages valve seat 53 closing off the supply of pressurized air and the pressure is exhausted from the variable pressure chamber 43 through the valve 50, which is open the increased distance G+T facilitating rapid exhaustion of the pressure in variable pressure chamber 43. On the other hand, since the actuation closure distance for valve 50 is limited to the distance T, rapid closure is enabled for enhanced apply system response.

Referring again to FIG. 2, the power booster 14 is connected with the pressurized air supply 15 through the line 78 which connects to storage reservoir 79. Storage reservoir 79 is charged by motor driven compressor assembly 80 and is prevented from discharging toward the compressor 80 by a check valve 81, which is positioned in a conduit 82 that extends between the compressor 80 and the storage reservoir 79. The air supply is drawn into the compressor 80 through intake 83 and filter 84. The air is forced through a single chemical desiccant dryer 85 and through check valves 87 and 81 to the storage reservoir 79. A pressure regulator 88 is provided across the compressor assembly 80 to limit the maximum possible air pressure to a selected level, and a pressure relief 89 is provided from the storage reservoir 79 to the atmosphere. The compressor 80 operates to charge the storage reservoir 79 to a preselected pressure level and when that pressure is reached the pressure switch 90 signals a control mechanism 91 that effects an operational status change wherein compressor assembly 80 is turned off and normally open solenoid valve assembly 92 is de-energized. Control mechanism 91 can take the form of a simple relay circuit, or may be provided in an electronic controller.

A regeneration reservoir 94 is connected into the conduit 82 between the dryer 85 and the storage reservoir 79, with an orificed bypass 95 provided around the check valve 87. When the compressor 80 is off and the solenoid 92 is open, dry pressurized air contained in regeneration reservoir 94 is discharged in a restricted manner, through the orifice 95, the dryer 85 and the solenoid 92. This removes water from the dryer 85 and provides a regeneration function so that it is ready for the next cycle. In the present embodiment, the regeneration reservoir is design to hold approximately fifteen percent of the air that is passed through the dryer 85 in a normal cycle.

When the power booster 14 is actuated so that the variable pressure chamber 43 is open to the pressurized air supply 15, a drop in pressure is sensed by the pressure switch 90 and the control mechanism 91 initiates energization of the compressor 80 and solenoid valve 92 starting a charge cycle. The present invention functions with a single dryer 85 that operates at a positive pressure and therefore, requires recirculation of only a fraction of the dried air for regeneration.

What is claimed is:

1. A brake apply system comprising:
    a power booster having a housing;
    a power piston carried in the housing and being translatable within the housing, the power piston including a body having an open center area with a first valve seat and a second valve seat positioned in the open center area, and the power piston having an annular stop that has a center hole, a first side and a second side wherein the first side faces the open center area of the body and includes a first annular valve element and wherein the second side faces away from the open center area and includes a protruding leg;
    a sealing element carried between the power piston and the housing so that a variable pressure chamber and an atmospheric pressure chamber are defined in the housing on opposite sides of the power piston;
    a pressure supply conduit passing through the power piston body to the open center area;
    a pushrod engaging a valve body;
    a clip surrounding the pushrod; and
    the valve body positioned in the open center area and having a second annular valve element and having a radially extending rib and an extension that is positionable through the center hole of the annular stop, wherein when the power booster is completely released and at-rest, the leg of the stop engages the clip and the extension of the valve body engages the clip so that the radially extending rib of the valve body is axially spaced away from the stop by a first distance, while the first valve seat is engaged with the first annular valve element closing the pressure supply conduit off from the variable pressure chamber and the second valve seat is spaced away from the second annular valve element by a second distance, opening the variable pressure chamber to the atmospheric pressure chamber;
    wherein, when the power booster is applied by operation of the pushrod, the second annular valve element moves the second distance and engages the second valve seat closing the variable pressure chamber off from the atmospheric pressure chamber and the first valve seat separates from the first annular valve element opening the pressure supply conduit to the variable pressure chamber, wherein the stop moves against the radially extending rib of the valve body so that when the pushrod is initially released the second annular valve element is movable away from the second valve seat a third distance equal to a sum of the first distance and the second distance.

2. A brake apply system according to claim 1 further comprising a pressurized air supply connected to the pressure supply conduit, the pressurized air supply including a storage reservoir that stores a supply of dried air for delivery to the variable pressure chamber, with a compressor operating to charge the storage reservoir wherein a conduit extends between the compressor and the storage reservoir, the conduit passing through a dryer, with a regeneration reservoir connected with the conduit between the dryer and the storage reservoir wherein a discharge line includes a normally open solenoid valve and is connected with the conduit between the dryer and the compressor wherein when the compressor is turned on the solenoid valve is closed and when the compressor is turned off the solenoid valve opens and a quantity of dry air contained in the regeneration reservoir passes through the dryer, the discharge line and the solenoid valve, regenerating the dryer.

3. A brake apply system comprising:
    a power booster having a pressure supply opening;
    a pressurized air supply connected to the pressure supply opening, the pressurized air supply including a storage reservoir that stores a supply of dried air for supplying the power booster, with a compressor operating to charge the storage reservoir wherein a conduit extends between the compressor and the storage reservoir, the conduit passing through a dryer, with a regeneration reservoir connected with the conduit between the dryer and the storage reservoir wherein a discharge line includes a normally open solenoid valve and is connected with the conduit between the dryer and the compressor wherein when the compressor is turned on the solenoid valve is closed and when the compressor is turned off the solenoid valve opens and a quantity of dry air contained in the regeneration reservoir passes through the dryer, the discharge line and the solenoid valve, regenerating the dryer.

4. A brake apply system according to claim 3 wherein the power booster includes:
    a housing;
    a power piston carried in the housing and being translatable within the housing, the power piston including a body having an open center area with a first valve seat and a second valve seat positioned in the open center area, and the power piston having an annular stop that has a center hole, a first side and a second side wherein the first side faces the open center area of the body and includes a first annular valve element and wherein the second side faces away from the open center area and includes a protruding leg;

a sealing element carried between the power piston and the housing so that a variable pressure chamber and an atmospheric pressure chamber are defined in the housing on opposite sides of the power piston wherein the pressure supply conduit passes through the power piston body to the open center area;

a pushrod engaging the valve body;

a clip surrounding the pushrod; and a valve body positioned in the open center area and having a second annular valve element and having a radially extending rib and an extension that is positionable through the center hole of the annular stop.

5. A brake apply system according to claim 4 wherein when the power booster is completely released and at-rest, the leg of the stop engages the clip and the extension of the valve body engages the clip so that the radially extending rib of the valve body is axially spaced away from the stop by a first distance, while the first valve seat is engaged with the first annular valve element closing the pressure supply conduit off from the variable pressure chamber and the second valve seat is spaced away from the second annular valve element by a second distance, opening the variable pressure chamber to the atmospheric pressure chamber.

6. A brake apply system according to claim 5 wherein when the power booster is applied by operation of the pushrod, the second annular valve element moves the second distance and engages the second valve seat closing the variable pressure chamber off from the atmospheric pressure chamber and the first valve seat separates from the first annular valve element opening the pressure supply conduit to the variable pressure chamber, wherein the stop moves against the radially extending rib of the valve body so that when the pushrod is initially released the second annular valve element moves away from the second valve seat a third distance equal to a sum of the first distance and the second distance.

7. A brake apply system according to claim 6 wherein the pushrod of the power booster includes a shoulder that is engageable with the clip to force the power piston to move.

8. A brake apply system comprising:

a master cylinder;

a brake line connected to the master cylinder, wherein fluid pressure generated in the master cylinder is transmitted to the brake line;

a power booster engaging the master cylinder, the power booster including a valve body having an annular valve element, an annular rib and an extension that is positionable through an annular stop, wherein when the power booster is completely released and at-rest the annular rib of the valve body is axially spaced away from the annular stop by a first distance, and a valve seat is spaced away from the annular valve element by a second distance, and when the power booster is actuated, the annular valve element closes moving the second distance, wherein the annular stop moves against the annular rib of the valve body so that when the power booster is initially released the annular valve element opens a third distance equal to a sum of the first distance and the second distance; and a pressurized air supply connected to the power booster.

9. A brake apply system according to claim 8 wherein the pressurized air supply includes a compressor that charges a storage reservoir, wherein the storage reservoir is continuously open to the power booster, and the pressurized air supply includes a single dryer that is positioned between the compressor and the storage reservoir.

10. A brake apply system according to claim 9 wherein the pressurized air supply includes a regeneration reservoir connected between the storage reservoir and the dryer, wherein when the power booster is actuated, the pressurized air supply operates for a cycle and a quantity of air passes through the dryer, and wherein when the cycle is complete, the regeneration reservoir is discharged through the dryer, and wherein the regeneration reservoir holds an amount of air equal to no more than approximately fifteen percent of the quantity of air passed through the dryer.

* * * * *